Sept. 30, 1941.  G. C. CONNOLLY  2,257,157
USING CATALYSTS
Filed May 20, 1938
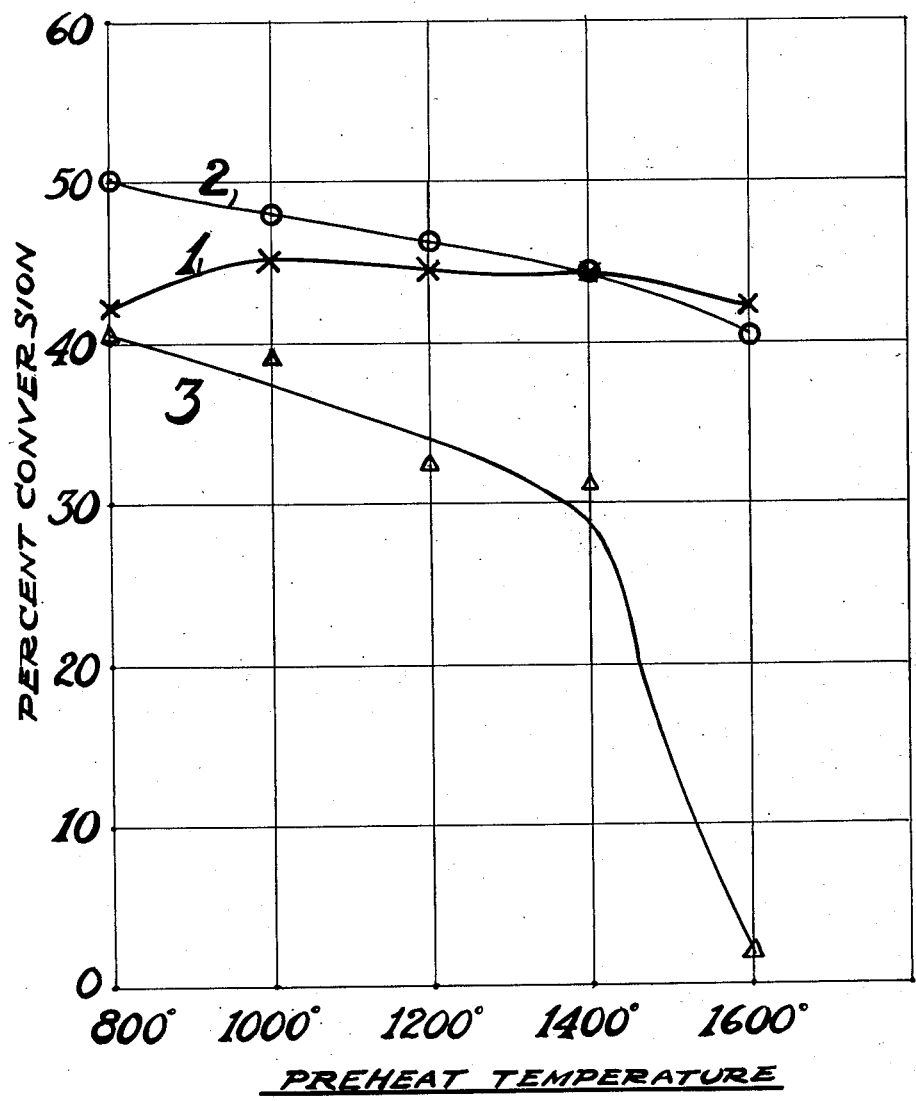
Gerald C. Connolly Inventor
By P. L. Young Attorney Patented Sept. 30, 1941

2,257,157

UNITED STATES PATENT OFFICE 2,257,157

USING CATALYSTS

Gerald C. Connolly, Baton Rouge, La., assignor to Standard Oil Development Company, a corporation of Delaware Application May 20, 1938, Serial No. 208,968

5 Claims. (Cl. 196—52)

This invention relates to the use of synthetic gels adapted for the treatment of hydrocarbons and particularly for the catalytic cracking of hydrocarbons. It more particularly pertains to using synthetic adsorptive catalysts having a high catalytic efficiency coupled with good regenerative properties.

While the catalysts will have a more general application, such as in other types of hydrocarbon reactions including purification, refining and polymerization, it has been found to be particularly suitable for catalytic cracking.

It has previously been discovered that the cracking of hydrocarbon oil in the presence of certain solid adsorbent contact materials such as naturally active or activated clays results in the formation of high yields of motor fuel having high anti-knock properties.

During the cracking operation, the contact mass becomes fouled more or less rapidly with carbonaceous deposits requiring periodic discontinuance of the cracking treatment to remove such deposits. This removal can be accomplished by passing an oxidizing gas through the mass and burning off the carbon. Such treatment results in the evolution of a considerable quantity of heat.

One objection to the use of adsorptive clays for catalytic cracking is that when exposed to high temperatures in excess of 1000° F. for example, such materials rapidly lose their catalytic activity. In view of this, it is necessary to provide means for rapidly removing heat liberated during regeneration to avoid permanent impairment of the efficiency of the catalyst. One method of controlling regenerating temperature is to dilute the oxidizing gas with an inert gas to reduce the reaction rate and increase the capacity of the gases to remove heat of reaction. This necessarily slows down the regeneration and increases the length of time the catalyst and reaction chamber is out of operation thus requiring more reaction chambers to produce a given yield of gasoline.

Another method of regulating the temperature is to provide indirect heat exchangers within the reaction chambers. All of such temperature control provisions materially increases the expense of equipment for any given capacity.

Moreover, even when the regenerating temperature is accurately controlled to avoid excessive temperatures the activity of the catalyst is gradually reduced over an extended period. While the cause of this is not fully known, one explanation may be that the carbonaceous deposits contain traces of constituents, formed during the cracking or regenerating period, such as for example, graphitized carbon, which has a high ignition temperature and which cannot be burned at the low temperature necessary to avoid rapid deactivation of the catalyst.

Another objection to adsorptive clay catalysts is that the maximum efficiency even when freshly prepared is relatively low.

It is an object of the present invention to use an improved adsorptive cracking catalyst having a higher efficiency and which will maintain its efficiency over a longer period.

A further object of the invention is to utilize synthetic adsorptive catalysts having high catalytic activity coupled with excellent regenerative properties.

Another object of the present invention is to provide a more effective method of cracking hydrocarbon oils which will produce a motor fuel of improved quality.

Other more specific objects and advantages of my invention will be apparent from the more detailed description hereinafter.

The invention will be described with reference to the utilization of a two component catalyst comprising silica and alumina as major constituents, it being understood that certain amounts of other components may be added as modifying agents by which is meant components serving as stimulators, activators, stabilizers, diluents or reinforcing agents for the catalyst.

In accordance with the invention, one of the starting materials employed in the preparation of the catalyst is a washed hydrous oxide of silica and preferably silica hydrogel. The latter forms an intermediate product in the preparation of silica gel and its method of preparation is well known to those familiar with this art. One method of preparation is described for example in the Patrick Patent 1,297,724, to which reference is made for a more complete disclosure of its preparation.

Briefly, the method comprises combining equal portions of sodium silicate solution and acid in such concentrations as to form a clear colloidal solution of silicic acid which upon standing sets into a firm hydrogel structure. While a true silica hydrogel is preferred, a mixture of hydrogel and gelatinous precipitate of silica or the gelatinous precipitate itself may be employed and still gain many of the advantages of the present invention.

This firm hydrogel after being permitted to set until syneresis is fully developed is broken into small lumps and thoroughly washed until substantially free of reaction impurities. The washed hydrogel after draining to remove excess water constitutes one of the starting materials for preparation of the catalyst.

The silica hydrogel so formed differs from silica gel in that it has a jelly appearance whereas silica gel is hard glass-like material obtained by dehydrating the hydrogel. The hydrogel employed in the present invention may, however, be subjected to partial dehydration insufficient to completely destroy its jelly-like appearance.

One of the important phases of the method resides in carefully controlling the conditions obtained during the preparation and washing of the hydrogel so that the resulting product has a capillary structure having pores of optimum size for maximum efficiency and high temperature stability. Although the size of the pores is too small for accurate direct measurements, it has been found that apparent density measurements are an indirect but nevertheless definite method of determining pore size. Such measurements are made by weighing 4-12 mesh granules of dry silica gel formed from the hydrogel and heat treated at a temperature of 1000° F. for four hours, and are expressed as the weight in grams per cubic centimeter of said granules. Other conditions being maintained equal variations in apparent density measurements indicate corresponding changes in pore size, the higher the density, the smaller the pores and the lower the density the larger the pores.

It has been found that for high cracking efficiency combined with long active life over repeated regenerations the pore size of silica gel formed from the washed hydrogel should correspond to apparent density measurements between .4 and .8 and for maximum efficiency coupled with maximum life, the apparent density should be between about .5 and .7.

Other conditions remaining equal, the efficiency of a given volume of catalyst increases with the apparent density of the silica gel formed from said hydrogel until the apparent density becomes of the order of .7 or .8 thus indicating that up to such point the total weight of catalyst is being taken advantage of. Beyond this point, the efficiency tends to drop off indicating on the other hand that the pore size has become too small to permit rapid penetration of the cracking gases through the catalyst mass and that the total weight of the catalyst is not being employed to full advantage.

However, as will appear from specific examples hereinafter when the apparent density is increased beyond about .6, the activity of the catalyst depreciates more rapidly and the active life of the catalyst is lowered or the overall efficiency thereof is reduced. While the reason is not definitely known, it is thought to be due to shrinking of the catalyst pores by prolonged exposure to elevated temperature necessary for effecting the desired cracking and regeneration. Whatever the explanation may be, it has been found as a result of extensive investigations that for maximum overall activity over long periods of cracking and regeneration the apparent density of the dry silica formed from the hydrogel as measured in the manner hereinbefore described should be between about .5 and .6.

Various methods for controlling the apparent density of silica gel are known to those familiar with the art and need not here be described in detail. The apparent density may be modified, for example, by changing the temperature and duration of the washing treatment. Thus the apparent density may be lowered by increasing the temperature of the wash water or by prolonging the washing treatment. By way of illustration, an apparent density of the order of .50 may be produced by washing the hydrogel for a period of about 40 hours at a temperature of 200° F.

The washed hydrogel prepared in the above described manner to produce a product of the required density is next combined with aluminum oxide to form a mixed catalyst of silica and alumina.

The silica hydrogel is impregnated with a solution of an aluminum compound which can be decomposed or converted into aluminum oxide. Such a compound may be a decomposable salt such as aluminum nitrate or aluminum acetate, or it may be an organic aluminum compound. For example, when employing an aluminum nitrate solution, the impregnation may be accomplished by soaking the hydrogel in the nitrate solution, for example, over a period of about 12 hours, followed by draining and drying. The dried material is then slowly heated to a temperature of approximately 700° F. or somewhat higher to decompose aluminum nitrate to form the aluminum oxide and convert the silica hydrogel into a dry gel.

The resulting material forms the desired product, although it will be understood that the invention does not preclude the addition of other constituents to serve as modifying agents such as promoters, activators, stabilizers, diluents and reinforcing agents for example. Such additional constituents may be combined chemically or mechanically in any desired manner.

The relative proportions of silica and alumina present in the final product may be varied over an extended range without greatly affecting the efficiency of the catalyst, as will appear from more specific examples hereinafter. Catalysts having molar ratios of silica to alumina 8 to 1 up to 50 to 1 all exhibit a high level of activity although the optimum ratio for maximum activity is between 10 and 15 to 1 and specifically about 12 to 1.

Having described the nature of the catalyst and method of preparation, the following examples are submitted as a guide to carrying out the invention to obtain the greatest advantages thereof, it being understood that conditions given are illustrative rather than limitive. Before proceeding with the examples, it is desired to point out that the efficiency of the catalyst was determined under the same condition in each case and the efficiency is expressed in yield or percentage conversion of liquid distillate having an end point of 400° F. The conditions maintained during such tests were as follows. East Texas gas oil of 33.8 A. P. I. gravity preheated to 850° F. was passed through a reaction zone containing the catalyst to be tested at a rate of .6 volume of liquid oil per volume of catalyst per hour for two hour cracking periods. The catalyst reaction chamber was maintained at a temperature of 850° F.

*Example 1.*—A series of five catalysts were prepared from aliquot parts of silica hydrogel, a sample of dry silica gel of which after having been maintained at a temperature of 1000° for four hours had an apparent density at room temperature of .40, were impregnated by first soaking in aluminum nitrate solutions of different concentration for 12 hours followed by draining and drying. The dried products were then ground, pilled and activated by heating at 800° F. for three hours. The dried products had ratios of silica to alumina of 60/1, 30/1, 15/1, 12/1 and 8/1. These products when tested as above described effected conversions of 20%, 33%, 30.5%, 35.5% and 30% respectively.

Example 2.—A second series of six catalysts was prepared from aliquot portions of washed silica hydrogel prepared in the same manner except that conditions were controlled so that the corresponding dry silica gel had an apparent density of .60 rather than .40. The hydrogel was impregnated with aluminum nitrate in the same manner except that the concentrations were modified to produce mol ratios of silica to alumina of 60/1, 30/1, 15/1, 12/1, and 8/1. These catalysts effected conversions of 43%, 50.5%, 51.5%, 53.5% and 46% respectively These examples illustrate the effect of the relative proportions of silica and alumina and also the effect of apparent density on the activity of the catalyst.

Example 3.—Two other catalysts were prepared from different hydrogels in the same manner having molar ratios of silica to alumina of 12 to 1. In one case the apparent density of dry silica gel produced from the hydrogel employed was .69 and in the second case it was .53. In the first case the conversion was 56% and in the latter 42%.

Example 4.—To determine the effect of temperature on the initial activity of the catalysts separate samples of the last mentioned catalyst were heat treated at temperatures of 800°, 1000°, 1200°, 1400° and 1600° for a period of two hours and afterwards tested with resulting conversions of 42%, 45%, 44.5%, 44% and 42% respectively.

Example 5.—Separate samples of catalysts having a mol ratio of silica to alumina of 14 to 1 and prepared from a hydrogel, the dry gel of which had an apparent density of .60 were likewise heat treated in the same manner as in Example 4. These products when afterwards tested under the same conditions' resulted in conversions of 50%, 48%, 46%, 44% and 40% respectively.

Example 6.—For comparative purposes separate samples of activated clay marketed under the trade name of Superfiltrol and considered one of the most highly active clays for cracking purposes was likewise heat treated and afterwards tested in the same manner with resulting conversion of 40%, 39%, 32%, 31% and 2% respectively.

The comparative effect of heat treatment of the catalyst on initial catalyst activity is better illustrated in the accompanying drawing in which percentage conversion is plotted against the temperature at which the catalyst was preheated for two hour periods. In the drawing, curve I shows the effect on a catalyst prepared in accordance with the present invention in which the apparent density of the silica gel formed from the hydrogel was .53, curve number 2 is a similar catalyst except that the apparent density of the silica gel was .60 and curve 3 illustrates the effect of preheat temperature on activated clay.

From an inspection of the drawing, it will be seen that whereas the catalyst employed in curve I has a lower initial activity than the catalyst employed for producing curve 2, it is relatively more stable to high temperature as evidenced by the fact that curve 2 has a greater pitch. The drawing also illustrates the marked advantage of synthetic catalysts prepared according to the present invention both with respect to their much higher initial activity and ability to withstand higher temperatures without loss in activity.

While I have described the preferred embodiment and given specific examples thereof, it will be understood that it embraces such other variations and modification as come within the spirit and scope thereof.

I claim:

1. A method of converting hydrocarbon oil into lower boiling hydrocarbons suitable for motor fuel which comprises passing said oil while at cracking temperature in contact with a catalyst, formed by impregnating silica hydrogel, the dry gel of which has an apparent density of at least .50, with a decomposable salt of aluminum and thereafter converting said decomposable aluminum salt into alumina and said hydrogel into a dry gel, for a time sufficient to effect the desired conversion.

2. In the catalytic cracking of hydrocarbon oils wherein the oil in vapor form is passed in contact with a solid catalyst while at cracking temperature for a period sufficient to effect the desired conversion, the improvement which comprises employing a catalyst formed by impregnating silica hydrogel, the dry gel of which has an apparent density of at least .50, with a salt of aluminum decomposable into alumina and thereafter converting said salt into alumina and said hydrogel to a dry gel.

3. In the catalytic cracking of hydrocarbon oils wherein the oil in vapor form is passed in contact with a solid catalyst while at cracking temperature for a period sufficient to effect the desired conversion, the improvement which comprises employing a catalyst formed by impregnating silica hydrogel, the dry gel of which has an apparent density between about .5 and .8 with a salt of aluminum decomposable into alumina, and thereafter converting said salt into alumina and said hydrogel to a dry gel.

4. In the catalytic cracking of hydrocarbon oils wherein the oil in vapor form is passed in contact with a solid catalyst while at cracking temperature for a period sufficient to effect the desired conversion, the improvement which comprises employing a catalyst formed by impregnating silica hydrogel, the dry gel of which has an apparent density between about .5 and .6 with a salt of aluminum decomposable into alumina and thereafter converting said salt into alumina and said hydrogel to a dry gel.

5. In the catalytic cracking of hydrocarbon oils wherein the oil in vapor form is passed in contact with a solid catalyst while at cracking temperature for a period sufficient to effect the desired conversion, the improvement which comprises employing a catalyst formed by impregnating silica hydrogel, the dry gel of which has an apparent density between about .5 and .6 with a salt of aluminum decomposable into alumina and thereafter converting said salt into alumina and said hydrogel to a dry gel, the molar ratio of silica and alumina being between 8 and 50 to 1.

GERALD C. CONNOLLY.